(12) United States Patent
Muniandy

(10) Patent No.: US 6,758,892 B2
(45) Date of Patent: Jul. 6, 2004

(54) PAVING COMPOSITIONS

(75) Inventor: Ratnasamy Muniandy, Selangor Darul Ehsan (MY)

(73) Assignee: Universiti Putra Malaysia, Selangor Darul Ehsan (MY)

( * ) Notice: Subject to any disclaimer, the term of this patent is extended or adjusted under 35 U.S.C. 154(b) by 246 days.

(21) Appl. No.: 09/883,638

(22) Filed: Jun. 18, 2001

(65) Prior Publication Data

US 2002/0108534 A1 Aug. 15, 2002

(30) Foreign Application Priority Data

Sep. 11, 2000 (MY) .................................... PI 20004199

(51) Int. Cl.⁷ ............................................ C09D 195/00
(52) U.S. Cl. .............................. 106/164.5; 106/164.51; 106/164.6; 106/282; 106/284.01
(58) Field of Search ........................ 106/164.5, 164.51, 106/164.6, 282, 284.01

(56) References Cited

PUBLICATIONS

"Tech Notes", Washington State Department of Transportation, Sep. 2000.*
ITEM 400HS Standard Specification for Asphalt Concrete—High Stress Using Stone Mastic Asphalt with Cellulose Fibers, Flexible Pavements, Inc., Dec. 1998.*
"Performance of Stone Matrix Asphalt (SMA) Mixtures in the United States", NCAT Report No. 97–1, Jan. 1997.*
ITEM 400HS Standard Specification for Asphalt Concrete—High Stress Using Stone Mastic Asphalt with Cellulose Fibers, Flexible Pavements, Inc., Dec. 1998.*

* cited by examiner

Primary Examiner—David Brunsman
(74) Attorney, Agent, or Firm—Wolf, Greenfield & Sacks, P.C.

(57) ABSTRACT

The present invention relates to stone mastic asphalt compounds which are produced using a new technique and process. The process utilizes a specific aggregate gradation and matrix for high stability. Specially formulated fiber mastic asphalt is used to hold the aggregate in place while providing extended durability. This formulation is able to handle heavy loading from commercial vehicles and thus minimize pavement surface distresses. The use of the present invention is expected to reduce the cost of materials by about 15 to 20 percent.

24 Claims, 2 Drawing Sheets

PAVING COMPOSITIONS

RELATED APPLICATIONS

This application claims priority under 35 U.S.C. §119 from Malaysian patent application serial number PI 20004199, filed Sep. 11, 2000.

FIELD OF THE INVENTION

The present invention generally relates to a paving composition, in particular to stone mastic asphalt compound as a road paving composition.

BACKGROUND OF THE INVENTION

Aggregate-containing asphalt has been employed as a paving composition for roads or the like for many years. The asphalt includes bitumens as a predominant constituent and is conventionally obtained as a solid residue from the distillation of crude petroleum. The asphalt is converted to a fluid state when paving a road. One fluid form is the suspension or emulsion of the asphalt in water. After spreading and compressing the aggregate-containing asphalt, water evaporates and the asphalt hardens into a continuous mass.

SUMMARY OF THE INVENTION

The present invention includes new technology that utilizes a specific aggregate gradation and matrix for high stability. Specially formulated fibre mastic asphalt is used to hold the aggregate matrix in place while providing extended durability. The special formulation is able to handle heavy loading from commercial trucks and thus minimize pavement surface distresses. Some of the major applications of this cost effective technology are, for example, at traffic stop signs, exit and access ramps of highways, expressways, water ponding areas on highways, ascending and descending lanes, port areas with heavy container movements and parking lots. The use of the technology of the present invention is expected to reduce the cost of the material by 15 to 20 percent.

Accordingly, the present invention in one aspect provides a paving composition that has improved resilience and is able to handle heavy loading of commercial vehicles. The present invention in another aspect provides a paving composition that can minimize pavement surface distresses and is economical to produce.

These and other aspects of the invention are accomplished by:

A paving composition comprising aggregate and asphalt characterized in that:

a) a major proportion of the composition by weight is aggregate; and b) a minor proportion of the composition by weight is asphalt.

The aggregate comprises particles of a size such that at least 80 percent will be retained on a 2 mm sieve passing 19 or 20 mm sieve sizes, and about 60 to 75 percent will be retained on a 7 mm sieve passing 19 or 20 mm sieve sizes.

The paving composition technology according to the present invention provides an economical means to produce paving composition that are resilient, capable of handling heavy loading of commercial vehicles and providing a cost effective technology.

BRIEF DESCRIPTION OF THE DRAWINGS

Other aspects of the present invention and their advantages will be discerned after studying the detailed description in conjunction with the accompanying figures in which.

DETAILED DESCRIPTION OF THE INVENTION

Figure 1:
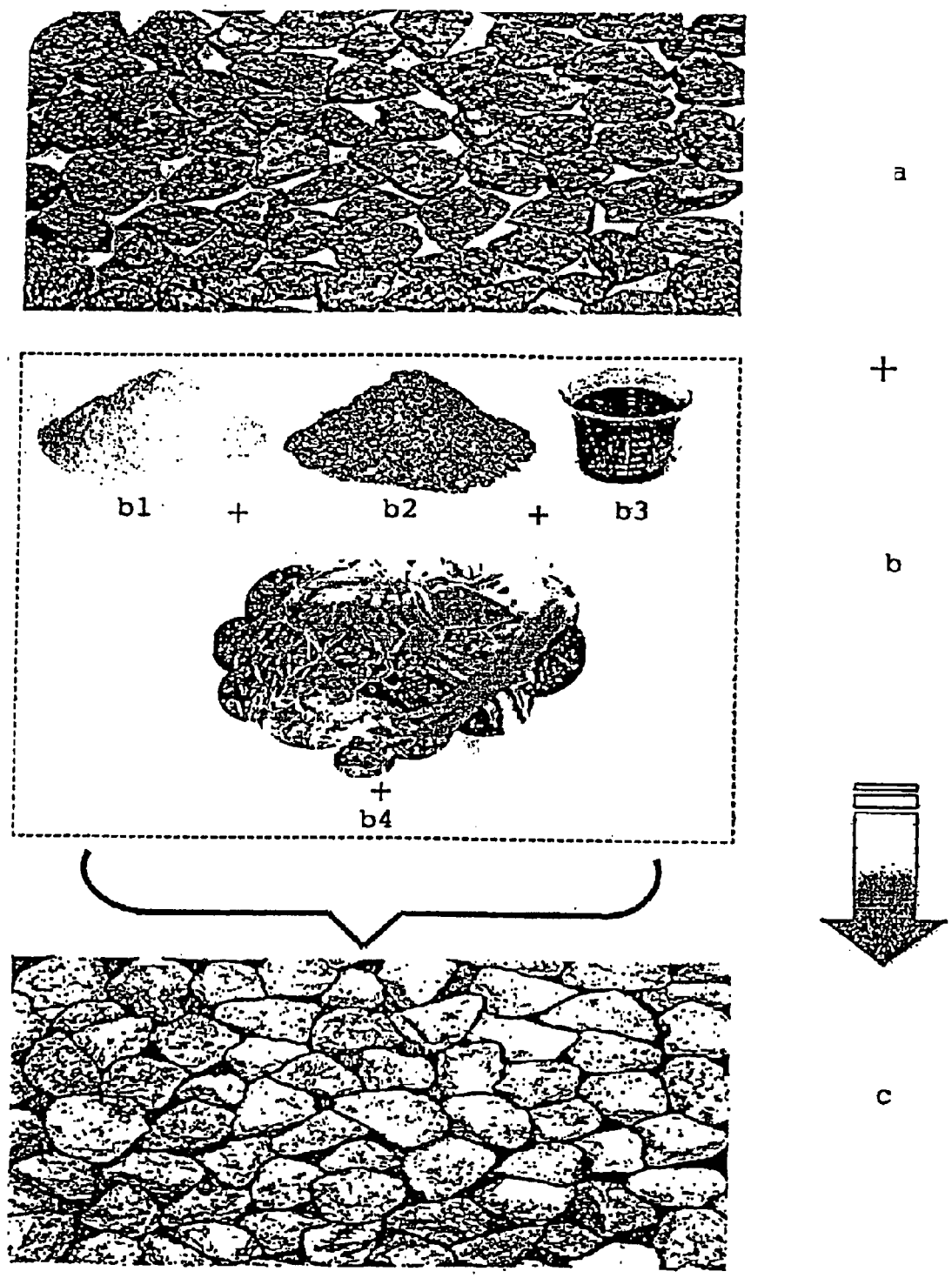
FIG. 1 is a schematic representation of a preferred embodiment of the paving composition according to the present invention. Depicted are: (a) stone skeleton or matrix; (b) mastic; (b1) filler; (b2) quarry dust; (b3) asphalt; (b4) cellulose (oil palm fibre); and (c) stone mastic asphalt comprising stone skeleton filled with mastic.
Figure 2:
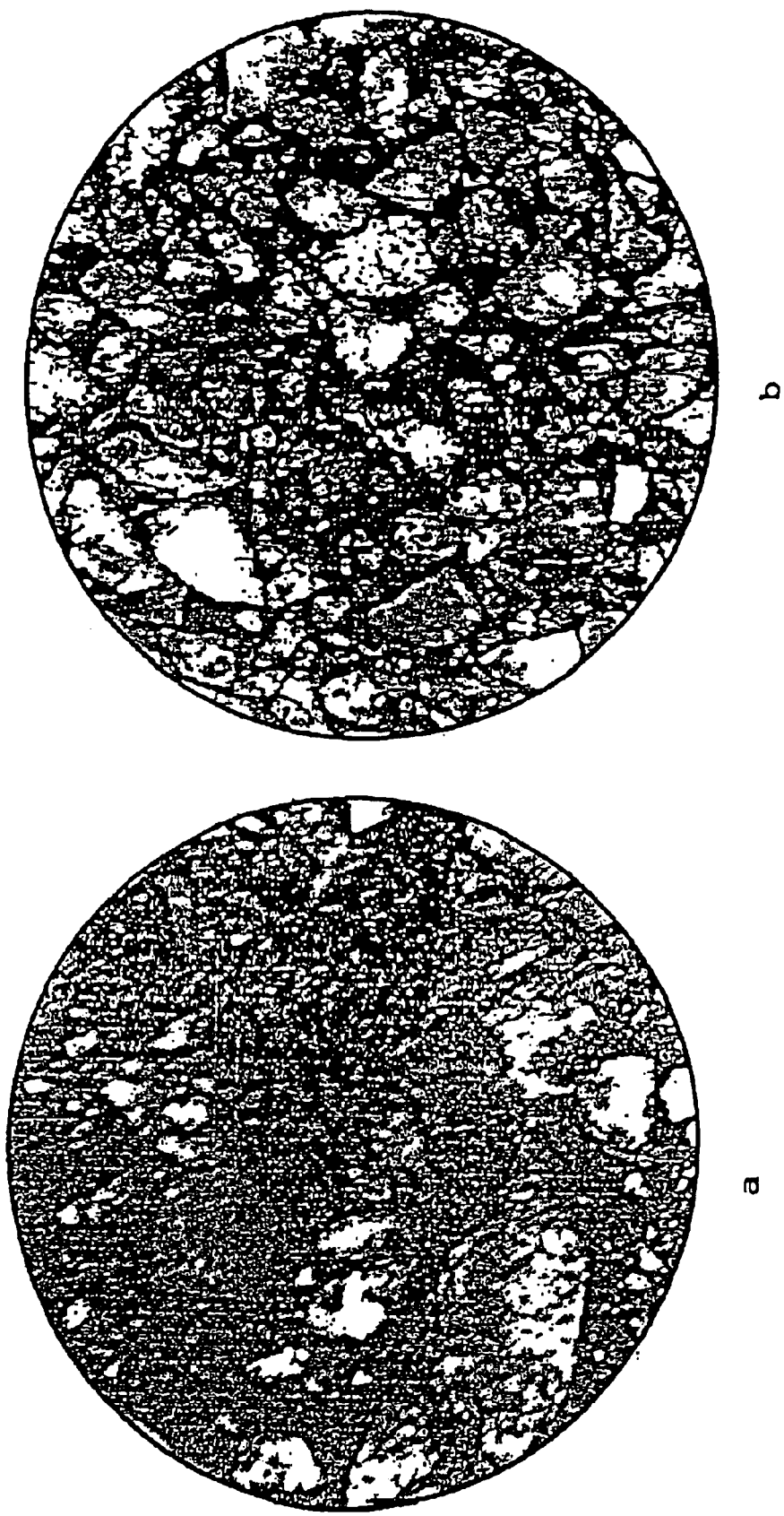
FIG. 2 is a comparison between a magnified view of stone mastic asphalt according to the present invention and a magnified view of a conventional mix for road paving. Depicted are: (a) conventional mix; and (b) stone mastic asphalt (SMA).

The aggregate used in the paving composition according to the present invention may be of a type conventionally employed in the road building industry. It may range from fine particles, such as sand, to relatively coarse, ground particles such as crushed stone, gravel or slag.

As mentioned above, the paving composition according to the invention contains a major proportion by weight of aggregate; as is conventional for road paving compositions.

The paving composition according to the invention is generally used in a method of producing a paving layer, which comprises applying a composition according to the invention to a substrate (such as the surface of a road) and curing the asphalt such that the aggregate in the paving layer is bonded together by cured solid asphalt.

Process

The paving composition of the present invention, stone mastic asphalt (SMA), is formulated with raw and processed materials using new techniques and processes, as shown in Tables 2 and 3. The details of the ingredients, mixing and compaction control processes are described below.

Aggregates

The aggregates for use in SMA should conform to the physical property requirement as shown in Table 4. The aggregates shall be heated up to a temperature of between 150° C. and 200° C., prior to mixing with the mastic asphalt. SMA uses aggregates like granite, basalt, quartzite, industrial slag, crushed concrete, crushed bottles, sand and sludge stones from domestic wastes. The types, sizes, shapes, and gradation of the aggregates to be used in SMA shall be as described in Tables 1 and 2. SMA uses specific gradation envelopes for different SMA products like SMA 14, SMA 12.5, SMA 10, SMA7, and SMA5.

TABLE 1

SMA Aggregate Gradation Envelope

| Sieve Sizes | SMA14 % Passing | SMA12.5 % Passing | SMA10 % Passing | SMA7 % Passing | SMA5 % Passing |
|---|---|---|---|---|---|
| 19.0 mm | 100 | 100 | | | |
| 14.0 mm | 80–100 | | 100 | | |
| 12.5 mm | | 80–95 | | | |
| 10.0 mm | 60–95 | | 80–96 | 100 | 100 |
| 9.50 mm | | 71–90 | | | |
| 6.70 mm | 44–76 | | 56–86 | 75–95 | |
| 5.00 mm | 30–56 | | | | 65–95 |
| 4.75 mm | | 40–70 | 46–60 | | |
| 2.36 mm | 19–30 | 16–30 | 17–30 | 42–60 | 40–50 |
| 0.60 mm | 10–17 | 10–20 | 10–20 | 10–20 | 10–20 |
| 0.30 mm | 6–15 | 9–13 | 9–13 | 9–13 | 9–13 |
| 0.075 mm | 4–10 | 4–10 | 4–10 | 4–10 | 4–10 |

The selection of the above sieve sizes and individual envelopes was developed after interactive research work at UPM Highway laboratory

TABLE 2

SMA Aggregate Proportions for SMA14, SMA12.5, SMA10, SMA7, and SMA5

| Sieve Sizes | SMA14 % Retained | SMA12.5 % Passing | SMA10 % Passing | SMA7 % Passing | SMA5 % Passing |
|---|---|---|---|---|---|
| 19.0 mm | 60–70% retained on 7.0 mm sieve passing 19 or 20 mm sieve size 80% or more retained on 2.36 mm or 2.0 mm passing 19 mm or 20 mm | 55–65% retained on 7.0 mm sieve passing 19 or 20 mm sieve size 75% or more retained on 2.36 mm or 2.0 mm passing 19 mm or 20 mm | 50–60% retained on 7.0 mm sieve passing 19 or 20 mm sieve size 70% or more retained on 2.35 mm or 2.0 mm passing 19 mm or 20 mm | 45–55% retained on 7.0 mm sieve passing 19 or 20 mm sieve size 65% or more retained on 2.36 mm or 2.0 mm passing 19 mm or 20 mm | 40–50% retained on 7.0 mm sieve passing 19 or 20 mm sieve size 60% or more retained on 2.36 mm or 2.0 mm passing 19 mm or 20 mm |
| 14.0 mm | | | | | |
| 12.5 mm | | | | | |
| 10.0 mm | | | | | |
| 9.50 mm | | | | | |
| 7.0 mm | | | | | |
| 5.00 mm | | | | | |
| 4.75 mm | | | | | |
| 2.36 mm | | | | | |
| 0.60 mm | | | | | |
| 0.30 mm | | | | | |
| 0.075 mm | | | | | |

TABLE 3

SMA mix Design Parameter

| | |
|---|---|
| Voids in Total Mix (VTM), percent | 3–5 |
| Asphalt Mastic Cement, percent | 5.8 minimum |
| Voids in Mineral Aggregates (VMA) | 16 minimum |
| Stability, kN | 7.0 minimum |
| Flow | 2–4 mm |
| Compaction, number of blows on each side of test specimen | 50 for normal use and 75 for heavy duty |
| Drain-down of mastic asphalt, percent | 0.35 max (2 hour reading) |
| Mastic Asphalt Heating temperature | 155 C.–175 C. |
| Aggregate Heating temperature | 150 C.–180 C. |
| SMA compaction temperature | 135 C. minimum |
| #40 tire rubber/latex powder, percent | 2–10 by weight of 80/100 Asphalt |
| -#200 rock fillers | 4–10 by weight of aggregates |

TABLE 4

Aggregate Physical Properties

| No. | Aggregate Tests | Quality Requirement |
|---|---|---|
| 1 | Los Angeles Abrasion | 30% max |
| 2 | Sodium Sulfate Soundness loss | 15% max |
| 3 | Aggregate Crushing Value | 30% max |
| 4 | Absorption | 2% max |
| 5 | Polished Stone Value | 49 minimum |
| 6 | Flatness & Elongation | 3:1 ratio 25% max 5:1 ratio 10% max |
| 7 | Angularity Number | 5–10 |
| 8 | Specific Gravity | 2.58 minimum |

The above aggregate properties can be confirmed by testing using ASTM, BS.MS or AASHTO standards Mastic Asphalt An asphalt with a penetration between 80 and 100 (80/100) shall be stabilized or modified with tire or latex powders of sizes 30 to 50 microns in a proportion of between 2 and 10 percent by weight of asphalt and cellulose fibre pellets that form the asphalt or binder mastic. Rock or slag fillers may be used in place of the above in a proportion of between 4 and 10 percent by weight of aggregates.

The main source of cellulose fibre are from oil palm, coconut, kenaf, rubber-wood and paper pulp, which are used in the formulation of fibre mastic. The cellulose fibres are specially ground and pulped to specific micron sizes that are found to give the best possible performance in terms of stability and drain down of asphalt. The cellulose fibres are mechanically pelletized with light asphalt emulsions or any other suitable materials, for easy packaging, storage and introduction into drum mix or batch mix plants. The proportion of emulsion to coat cellulose fibres is between 10 and 40 percent by weight of fibres.

Mix Design and Control

Both the heated materials are mixed for a duration of between 30 seconds to 3 minutes before the specimen can be compacted. The specimen or mixed SMA compound shall be compacted at a temperature not less than 130° C. at 50 blows per side for normal use and 75 blows per side for heavy traffic loading.

SMA Mix Drain-down Analysis

The uncompacted hot samples are tested for their mastic asphalt drainability using stainless steel ¼ inch mesh baskets. The mix shall not drain down more than 0.3% maximum by weight of total mix.

Performance Testing

The compacted samples shall be tested for the following to ensure quality and durability:

Stability

It measures the strength of the SMA paving compound after placing the specimen in a water bath of 60° C. (service temperature of pavements) for about 30 minutes. The samples are expected to display a minimum strength of 7.0 kN with a flow that falls within 2 to 4 mm range. The specimen is also expected to have a design airvoids of between 3 and 5%.

Moisture Induced Test

Tropical countries like Malaysia receives heavy rainfall that cause pavement damages due to moisture problems. SMA samples are expected to display a Tensile Strength Ratio (TSR) of at least 75%.

Modulus Values

The resilient modulus of the compacted SMA shall attain a minimum value of 3000 Mpa. The samples shall also display a minimum value of 10,000 load cycles to failure in terms of dynamic impact loading.

While the preferred embodiments of the present invention have been described, it should be understood that various changes, adaptations and modifications may be made thereto. It should be understood, therefore, that the invention is not limited to details of the illustrated invention shown in the figures and tables, and that variations in such minor details will be apparent to one skilled in the art.

What is claimed is:

1. A paving composition comprising aggregate and asphalt characterized in that:
   a) a major proportion of the composition by weight is aggregate; and
   b) a minor proportion of the composition by weight is asphalt; wherein
      the asphalt is present as a mastic; and
      the asphalt mastic comprises additives comprising oil palm cellulose fibre.

2. A paving composition us claimed in claim 1 in which the asphalt mastic comprises additives to provide enhanced stability and drainability.

3. A paving composition as claimed in claim 2 in which the asphalt mastic further comprises additives selected from the group consisting of tire powder, latex powder, rock filler, and slag filler.

4. A method of producing a paving layer, which comprises applying a composition according to claim 3 to a substrate and curing the asphalt such that the aggregate in the paving layer is bonded together by cured solid asphalt.

5. A paving composition as claimed in claim 3 in which the asphalt mastic additives comprise at least one of tire powder and latex powder, wherein the tire and/or latex powders are of sizes 30 to 50 microns in a proportion of between 2 and 10 percent by weight of the asphalt and oil palm cellulose fibre that form the asphalt mastic.

6. A method of producing a paving layer, which comprises applying a composition according to claim 5 to a substrate and curing the asphalt such that the aggregate in the paving layer is bonded together by cured solid asphalt.

7. A paving composition as claimed in claim 3 in which the asphalt mastic additives comprise at least one of rock and slap fillers and the rock and/or slag fillers are present in a proportion of between 4 and 10 percent by weight of the aggregate.

8. A method of producing a paving layer, which comprises applying a composition according to claim 7 to a substrate and curing the asphalt such that the aggregate in the paving layer is bonded together by cured solid asphalt.

9. A method of producing a paving layer, which comprises applying a composition according to claim 2 to a substrate and curing the asphalt such that the aggregate in the paving layer is bonded together by cured solid asphalt.

10. A paving composition as claimed in claim 1 in which the aggregate comprises particles of a size such that at least 80 percent will be retained on a 2 mm sieve passing 19 or 20 mm sieve sizes, and about 60 to 75 percent will be retained on a 7 mm sieve passing 19 or 20 mm sieve size.

11. A paving composition as claimed in claim 10 in which the aggregate comprises at least one of granite, basalt, quartzite, industrial slag, crushed bottles, crushed concrete, or sand and sludge stones from domestic wastes.

12. A method of producing a paving layer, which comprises applying a composition according to claim 11 to a substrate and curing the asphalt such that the aggregate in the paving layer is bonded together by cured solid asphalt.

13. A method of producing a paving layer, which comprises applying a composition according to claim 10 to a substrate and curing the asphalt such that the aggregate in the paving layer is bonded together by cured solid asphalt.

14. A paving composition as claimed in claim 1 in which the aggregate is granite, basalt, quartzite, industrial slag, crushed bottles, crushed concrete, or sand and sludge stones from domestic wastes.

15. A method of producing a paving layer, which comprises applying a composition according to claim; to a substrate and curing the asphalt such that the aggregate in the paving layer is bonded together by cured solid asphalt.

16. A paving composition as claimed in claim 1 in which the asphalt mastic further comprises cellulose fibre selected from the group consisting of coconut fibre, kenaf fibre, rubber-wood fibre and paper pulp fibre.

17. A method of producing a paving layer, which comprises applying a composition according to claim 11 to a substrate and curing the asphalt such that the aggregate in the paving layer is bonded together by cured solid asphalt.

18. A paving composition as claimed in claim 1 in which the cellulose fibre is mechanically pelletized with light asphalt emulsions or any other suitable materials.

19. A paving composition as claimed in claim 18 in which the proportion of asphalt emulsion to coat the cellulose fibre is between 10 and 40 percent by weight of the cellulose fibre.

20. A method of producing a paving layer, which comprises applying a composition according to claim 19 to a substrate and curing the asphalt such that the aggregate in the paving layer is banded together by cured solid asphalt.

21. A method of producing a paving layer, which comprises applying a composition according to claim 18 to a substrate and curing the asphalt such that the aggregate in the paving layer is banded together by cured solid asphalt.

22. A method of producing a paving layer, which comprises applying a composition according to claim 1 to a substrate and curing the asphalt such that the aggregate in the paving layer is bonded together by cured solid asphalt.

23. A paved layer which has been produced by a method according to claim 22.

24. A method of producing a paving layer, which comprises applying a composition according to claim 22 to a substrate and curing the asphalt such that the aggregate in the paving layer is bonded together by cured solid asphalt.

* * * * *

UNITED STATES PATENT AND TRADEMARK OFFICE
CERTIFICATE OF CORRECTION

PATENT NO. : 6,758,892 B2
DATED : July 6, 2004
INVENTOR(S) : Ratnasamy Muniandy

It is certified that error appears in the above-identified patent and that said Letters Patent is hereby corrected as shown below:

Column 5,
Line 13, delete "slap" and replace with -- slag --.

Column 6,
Line 4, delete ";" and replace with -- 14 --.
Lines 25 and 29, delete "banded" and replace with -- bonded --.
Line 32, delete "1" and replace with -- 9 --.

Signed and Sealed this

First Day of February, 2005

JON W. DUDAS
*Director of the United States Patent and Trademark Office*